(12) United States Patent
Haller et al.

(10) Patent No.: US 8,589,944 B2
(45) Date of Patent: Nov. 19, 2013

(54) METHOD AND SYSTEM FOR TASK MAPPING TO ITERATIVELY IMPROVE TASK ASSIGNMENT IN A HETEROGENEOUS COMPUTING SYSTEM

(75) Inventors: Michael Haller, Niwot, CO (US); Joan L. Mitchell, Longmont, CO (US); Nenad Rijavec, Longmont, CO (US); James T. Smith, II, Boulder, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 2171 days.

(21) Appl. No.: 11/083,384

(22) Filed: Mar. 16, 2005

(65) Prior Publication Data

US 2006/0212875 A1    Sep. 21, 2006

(51) Int. Cl.
*G06F 3/00* (2006.01)
*G06F 9/46* (2006.01)

(52) U.S. Cl.
USPC .......................................... 719/310; 718/318

(58) Field of Classification Search
USPC ............ 718/105, 100; 719/310; 710/100, 105
See application file for complete search history.

(56) References Cited

U.S. PATENT DOCUMENTS

| | | | |
|---|---|---|---|
| 4,980,857 A * | 12/1990 | Walter et al. ..................... 714/45 |
| 5,121,494 A | 6/1992 | Dias et al. |
| 5,548,737 A * | 8/1996 | Edrington et al. ............ 712/200 |
| 5,692,192 A * | 11/1997 | Sudo .............................. 718/105 |
| 5,860,137 A | 1/1999 | Raz et al. |
| 6,292,822 B1 | 9/2001 | Hardwick |
| 6,363,465 B1 * | 3/2002 | Toda .............................. 711/169 |
| 6,748,413 B1 | 6/2004 | Bournas |
| 6,748,414 B1 | 6/2004 | Bournas |
| 6,996,440 B2 * | 2/2006 | Maenishi et al. ............... 700/28 |
| 2002/0152305 A1 | 10/2002 | Jackson et al. |
| 2003/0061264 A1 * | 3/2003 | Benhase et al. ............... 709/105 |
| 2003/0115241 A1 * | 6/2003 | Saito et al. ..................... 709/102 |
| 2003/0236919 A1 | 12/2003 | Johnson et al. |
| 2005/0246711 A1 * | 11/2005 | Berstis et al. ................. 718/105 |
| 2006/0010440 A1 * | 1/2006 | Anderson et al. ................. 718/1 |

OTHER PUBLICATIONS

Gerald Westheimer, Discrimination of short time intervals by the human observer, May 19, 1999.*

* cited by examiner

*Primary Examiner* — Lechi Truong
(74) *Attorney, Agent, or Firm* — Duft Bornsen & Fettig, LLP

(57) ABSTRACT

Method and system aspects for mapping tasks to iteratively improve task assignment in a heterogeneous computing (HC) system include identifying a current machine that defines a makespan in the HC system. Further included is the reassigning of at least one task from the current machine to at least one alternate machine in the HC system according to a predefined reassignment constraint. Reassigning also includes reassigning the at least one task when the at least one alternate machine can perform the at least one task in addition to previously assigned work while finishing in less time than the time of the makespan reduced by time required for the task being reassigned.

3 Claims, 2 Drawing Sheets ered (a problem that becomes exponentially more difficult as the number of variables in the problem increases). Therefore, prior research has focused on developing heuristic approaches to address the problem in specific contexts. In this work, the goal of the heuristic is to minimize the total execution time of a meta-task, where a meta-task is defined to be a collection of independent sub-tasks. Some have proposed using the results of a known successful heuristic as a seed, or starting place, for a search of related solutions in an attempt to more readily find an improvement in overall system performance. System performance is determined by the inverse of the required system execution time to complete all sub-tasks in a given meta-task. Although these prior search techniques may improve on system performance they may require an arbitrarily large execution time to realize any improvement in overall system performance. Additionally, they may require arbitrarily large compute resources to execute properly.

Related approaches include attempts to minimize task lateness in a hard, real-time system by beginning from an arbitrary starting place and performing a depth-first search with no backtracking. However, these approaches do not always find a feasible solution in a reasonable amount of time. A feasible solution refers to one that satisfies all of the system constraints and a reasonable amount of time refers to the amount of time determined to be the system time available for scheduling.

Accordingly, a need remains for a task mapping technique for independent tasks in a heterogeneous computing system that can be executed in reasonable time producing a feasible task mapping and schedule.

BRIEF SUMMARY OF THE INVENTION

Method and system aspects for mapping tasks to iteratively improve task assignment in a heterogeneous computing (HC) system are presented. The aspects include identifying a current machine that defines a makespan in the HC system, and reassigning at least one task from the current machine to at least one alternate machine in the HC environment according to a predefined reassignment constraint. Further, reassigning includes reassigning the at least one task when the at least one alternate machine can perform the at least one task in addition to previously assigned work while finishing in less time than the time of the makespan reduced by the time required for the task being reassigned.

Through the present invention, a technique for task mapping produces a feasible solution in a reasonable amount of time. Further, the iterative nature of the technique results in an improvement of the makespan with every iteration with termination possible at any point guaranteed to have maintained or improved the system makespan. These and other advantages of the aspects of the present invention will be more fully understood in conjunction with the following detailed description and accompanying drawings.

DETAILED DESCRIPTION OF THE INVENTION

The present invention relates to task mapping in a heterogeneous computing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Figure 1:
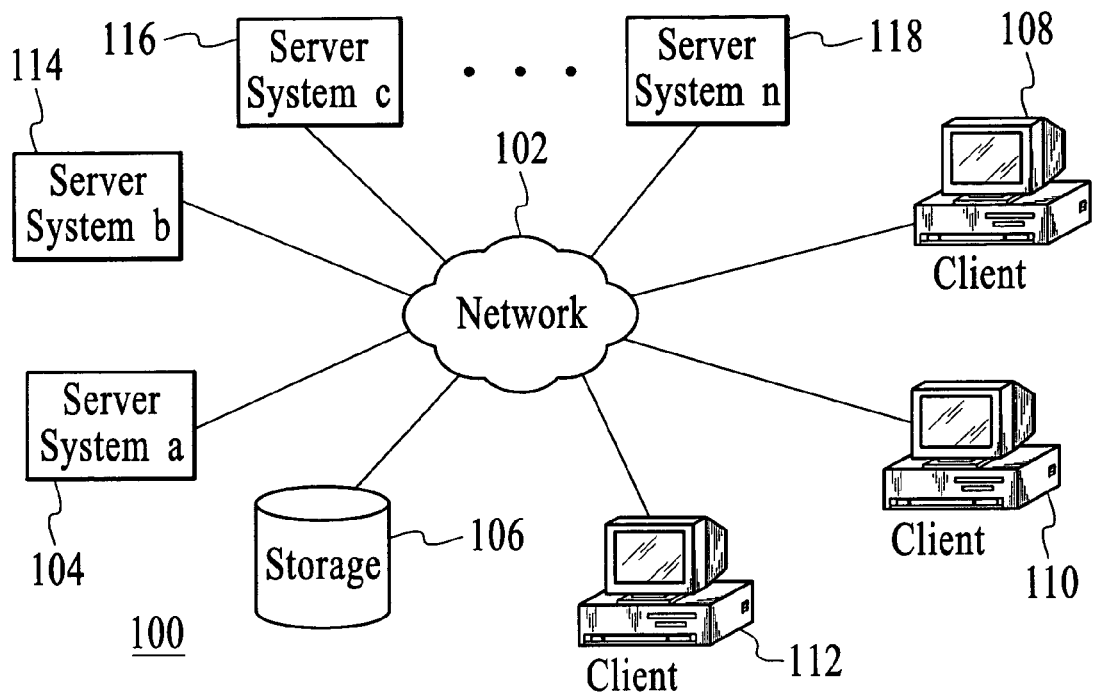
FIG. 1 illustrates a network system environment.

FIG. 1 illustrates a network system environment. The system 100 contains a network 102, which is the medium used to provide communication links between various devices and computers connected together within the system 100. Network 102 may include permanent connections, such as wire or fiber optic cables, or temporary connections made through telephone connections.

In the depicted example, a server system 104 is shown connected to network 102 along with storage unit 106. Server system 104 typically will contain two or more servers and is also referred to as a "cluster." In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as boot files, operating system images, and applications to clients 108-112. Clients 108, 110 and 112 are clients to server 104. The system 100 further includes other heterogeneous servers 114, 116, 118. In accordance with the present invention, the choreography involved with getting these heterogeneous servers 104, 114, 116, 118 to execute submitted tasks of the clients 108, 110, 112 in as short a time span as possible is addressed. The system 100 may be implemented as a number of different types of networks, such as for example, an intranet, a local area network (LAN), a wide area network (WAN), storage area network/system area network (SAN), etc. FIG. 1 is intended as an example and not as an architectural limitation for the present invention.

Figure 2:
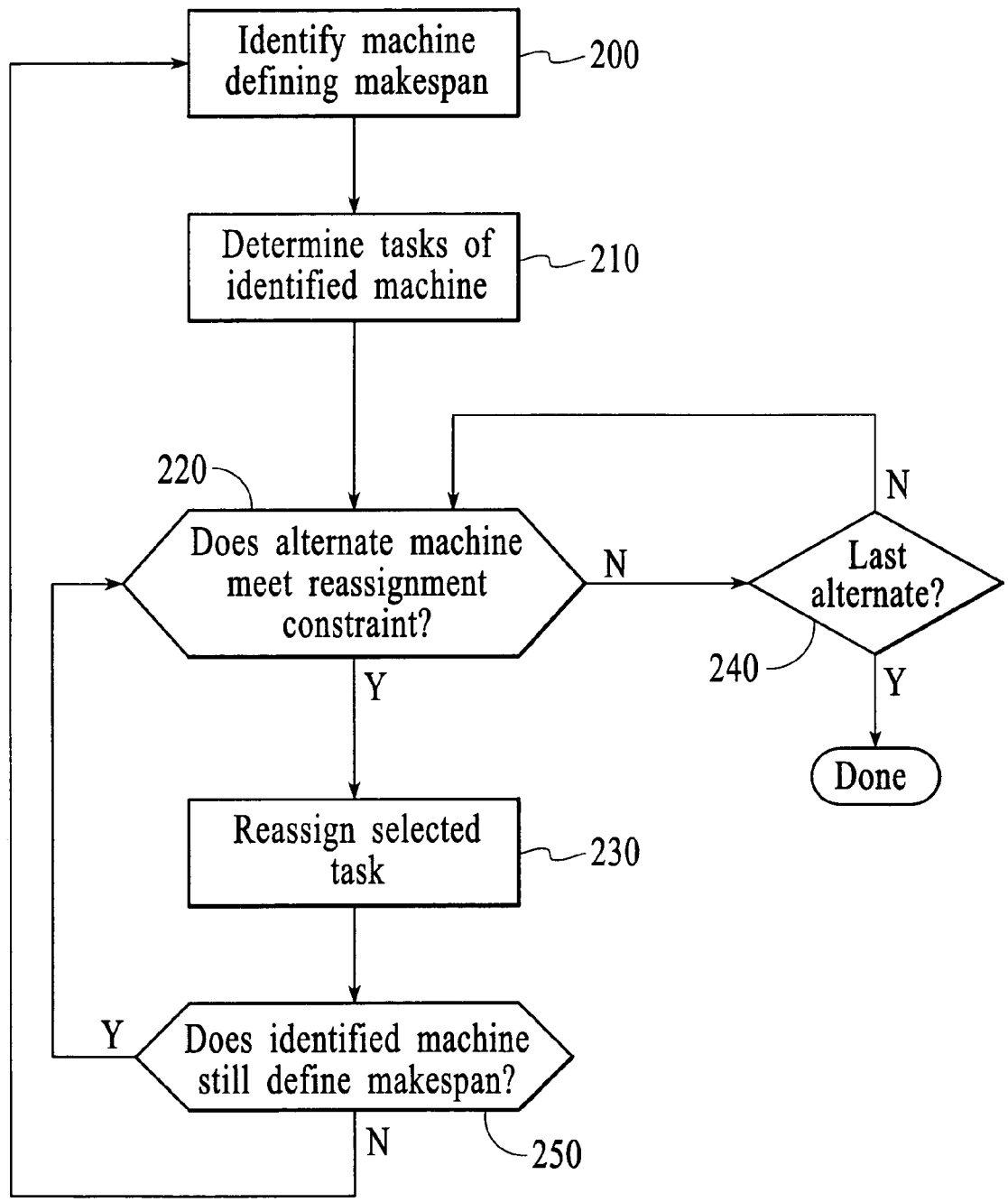
FIG. 2 illustrates a block flow diagram representation of a technique for task mapping of independent tasks in a heterogeneous computing system environment in accordance with the present invention.

FIG. 2 illustrates a block flow diagram representation of a technique in accordance with the present invention for task mapping of independent tasks in a heterogeneous computing (HC) system environment, such as shown in FIG. 1. The technique includes identifying the machine defining the makespan in the HC system (step 200). Makespan refers to the completion time of the meta-task. Sub-tasks for the meta-task are assigned to the machines in the HC system according to the initial task mapping. The machine in the HC suite that runs for the longest amount of time defines the makespan for the mapping.

The tasks of the identified machine are then determined (step 210). An attempt to reassign at least one task ensues. The reassigning includes checking an alternate machine in the HC system to see if the alternate machine can accomodate a task from the makespan machine in addition to their previously assigned work while continuing to finish in less time than the current makespan minus the execution time of that task on the makespan machine (step 220). When the reassignment constraint is met and the alternate machine can handle the task, the task is reassigned to the alternate machine (step 230). Each alternate machine is checked until the task is reassigned or no alternate machine is found that satisfies the constraint for reassignment (step 240).

When reassignment occurs, the technique continues by determining if the identified machine is still the makespan machine (step 250). While the identified machine is still the makespan machine, the process continues to attempt to reassign the tasks according the constraint for reassignment. Otherwise, the process returns to identify another machine now defining the makespan for the HC system, and the process is repeated until either no tasks from the makespan machine can be reassigned without violating the constraint or the tuning process is artificially terminated.

The following provides example code for implementing the technique for task mapping represented and described with reference to FIG. 2.

```
public static void tuneSchedule(schedule s) {
    int machinecount = s.getMachineCount( );
    boolean done = false;
    int machine = s.getMakespanMachine( );
    int makespan = s.getMachineSpan(machine);
    List tasks = s.getMachineTasks(machine);
    while(!done){
        done = true;
        boolean moved = false;
        List mtasks = new ArrayList( );
        Iterator iter = tasks.iterator( );
        while (iter.hasNext( )) {
            Task mover = (Task) iter.next( );
            //now let's find a machine, i, whose
            //span + etc(tasks[0],i) < makespan – etc(tasks[0],machine)
            int i = 0;
            moved = false;
            while (i < machinecount && !moved) {
                int ispan = s.getMachineSpan(i);
                int ietc = s.getEtcValue(mover.getID( ), i);
                int metc = s.getEtcValue(mover.getID( ), machine);
                if ((ispan + ietc) <= (makespan – metc)) {
                    //move the task
                    s.assign(i, mover);
                    makespan –= s.getEtcValue(mover.getID( ),
machine);
                    moved = true;
                }
                ++i;
            }
            if (!moved)
                mtasks.add(mover);
        }
        s.setMachineTasks(machine,mtasks);
        //check to see if this machine is still the makespan of the system
        int origmachine = machine;
        for (int j = 0; j< machinecount;++j) {
            If ((j != origmachine) && (s.getMachineSpan(j) >
makespan)) {
                machine = j;
                makespan = s.getMachineSpan(machine);
                tasks = s.getMachineTasks(machine);
```

```
                done = false;
            }
        }
    }
}
```

The process completes in a known, finite amount of time due to its "hill climbing" behavior, i.e., it will not evaluate solutions that do not improve its makespan. Every iteration of the algorithm will monotonically improve the makespan of the system therefore, the heuristic can be terminated at any point and guarantee that it has maintained or improved the system makespan. It should be appreciated that the performance of the technique is done by a computer processing system according to a suitable computer programming language stored on a computer readable storage medium either in a dedicated manner or as a background task on any of the machines in the heterogeneous system.

Use in a simulation environment compares the present invention to well known heuristics for allocating tasks to machines. The simulation was designed to represent the anticipated environment of the "transform appliance", where all machines in the system exhibit identical performance and task complexity varies greatly from task to task. Consideration is given to a currently used method referred to as OLB, Opportunistic Load Balancing, which assigns the next available task to the next available machine.

Figure 3:
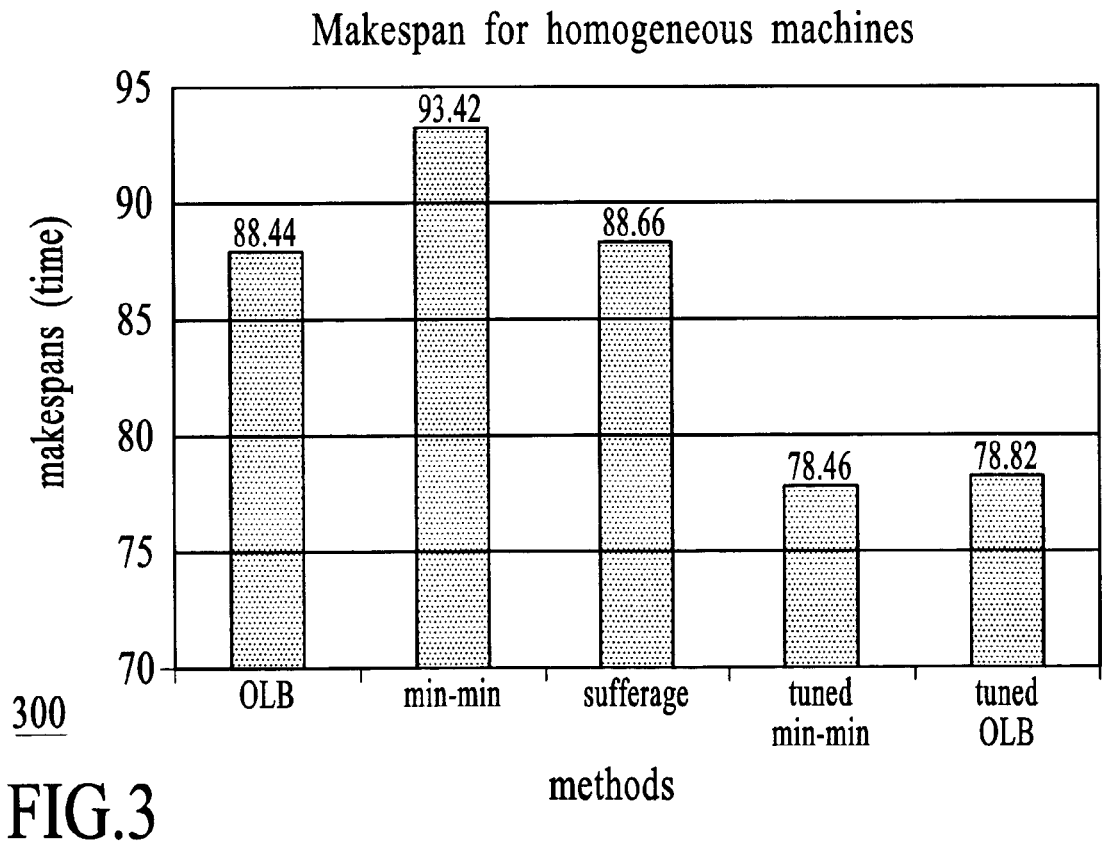
FIG. 3 illustrates a bar graph of simulation results of the present invention relative to other well-known heuristics from the literature.

FIG. 3 presents bar graph results 300 of the simulation, where tuned OLB represents the results of executing the described method against the OLB starting point. Included are the results found by the simulation for 100 trials, assuming 14 machines and 100 tasks to be assigned. The times represent the average makespan found by each approach. As shown by the graph 300, the procedure improves OLB performance by about 11%. The standard deviation of the OLB result was 6.88 and the standard deviation of the tuned OLB result was 4.74. The additional result included here is the tuned min-min, which represents the results of running the method described herein against the min-min starting point, where the min-min standard deviation was 6.73 and the tuned standard deviation was 4.88.

As described herein, the present invention provides method and system aspects for iteratively improving task assignment in a heterogeneous computing system. The method starts with a complete mapping of tasks and attempts to improve task assignments in a 'greedy' manner according to a predefined reassignment constraint. Thus, if a candidate machine would require more time to perform a task being reassigned than the current makespan minus the execution time of that task on the makespan defining machine, then the task will not be reassigned to the candidate machine. The rationale is that the gain is not large enough to justify the move. Therefore, the task stays assigned to the machine it is currently assigned to or is reassigned to some other machine where the condition of reassigning holds. After every reassignment, a check is made to see which machine in the heterogeneous system is the makespan determining machine.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method for improving performance of computing a task comprised of a plurality of sub-tasks in a heterogeneous computing (HC) system comprising a plurality of machines, the method comprising:
   assigning each of the sub-tasks to one of the machines for processing;
   estimating a time period for each of the machines to process the assigned sub-tasks;
   identifying a first machine having a longest estimated time period to process the assigned sub-tasks;
   selecting at least one of the assigned sub-tasks for the first machine for re-assignment;
   identifying a second machine capable of processing the selected sub-task and previously assigned sub-tasks in less time than the longest estimated time period for the first machine;
   re-assigning the selected sub-task from the first machine to the second machine for processing;
   determining if the first machine still has the longest estimated time period after re-assigning the selected sub-task;
   identifying another machine as having a longest estimated time period when the first machine no longer has the longest estimated time period; and
   repetitively performing the steps of estimating the time period, identifying a first machine, selecting an assigned sub-task, identifying a second machine, and re-assigning the selected sub-task until no machine is identified that is capable of processing the selected sub-task and previously assigned sub-tasks in less time than the longest estimated time period for the first machine.

2. A system for improving performance of computing a task comprised of a plurality of sub-tasks in a heterogeneous computing (HC) environment, the system comprising:
   a network of heterogeneous computing systems comprising a plurality of machines operable to process the sub-tasks; and
   a processing system operable to assign each of the sub-tasks to one of the machines for processing, to estimate a time period for each of the machines to process the assigned sub-tasks, to identify a first machine having a longest estimated time period to process the assigned sub-tasks, to select at least one of the assigned sub-tasks for the first machine for re-assignment, to identify a second machine capable of processing the selected sub-task and previously assigned sub-tasks in less time than the longest estimated time period for the first machine, to re-assign the selected sub-task from the first machine to the second machine for processing, to determine if the first machine still has the longest estimated time period after the re-assignment of the selected sub-task, to identify another machine as a having a longest estimated time period when the first machine no longer has the longest estimated time period, and to repetitively estimate a time period, identify a first machine, select an assigned sub-task, identify a second machine, and re-assign the selected sub-task until no machine is identified that is capable of processing the selected sub-task and previously assigned sub-tasks in less time than the longest estimated time period for the first machine.

3. A non-transitory computer readable medium tangibly embodying programmed instructions which, when executed by a computing system, are operable for performing a method of improving performance of computing a task comprised of a plurality of sub-tasks in a heterogeneous computing (HC) system comprising a plurality of machines, the method comprising:
   assigning each of the sub-tasks to one of the machines for processing; estimating a time period for each of the machines to process the assigned sub-tasks;
   identifying a first machine having a longest estimated time period to process the assigned sub-tasks;
   selecting at least one of the assigned sub-task for the first machine for re-assignment;
   identifying a second machine capable of processing the selected sub-task and previously assigned sub-tasks in less time than the longest estimated time period for the first machine;
   re-assigning the selected sub-task from the first machine to the second machine for processing;
   determining if the first machine still has the longest estimated time period after re-assigning the selected sub-task;
   identifying another machine as a having a longest estimated time period when the first machine no longer has the longest estimated time period; and
   repetitively performing the steps of estimating a time period, identifying a first machine, selecting an assigned sub-task, identifying a second machine, and re-assigning the selected sub-task until no machine is identified that is capable of processing the selected sub-task and previously assigned sub-tasks in less time than the longest estimated time period for the first machine.

* * * * *